United States Patent [19]

Sakurai et al.

[11] Patent Number: 4,768,635
[45] Date of Patent: Sep. 6, 1988

[54] CONTROL FOR THE CLUTCH OF A FLUID TORQUE CONVERTER IN A VEHICULAR TRANSMISSION

[75] Inventors: Yoshimi Sakurai; Takabumi Sakai; Keiichi Ishikawa; Noboru Sekine; Takashi Aoki; Satoshi Terayama; Tatsuyuki Ohhashi, all of Saitama, Japan

[73] Assignee: Honda Giken Kogyo Kabushiki Kaisha, Tokyo, Japan

[21] Appl. No.: 936,467

[22] Filed: Nov. 25, 1986

[30] Foreign Application Priority Data

Nov. 25, 1985 [JP] Japan ................................ 60-262676
Apr. 10, 1986 [JP] Japan ................................ 61-81199
Apr. 30, 1986 [JP] Japan ................................ 61-98167

[51] Int. Cl.⁴ ........................ F16D 47/02; B60K 41/02
[52] U.S. Cl. .................................. 192/0.076; 192/3.3; 192/3.29; 192/3.31; 192/103 F
[58] Field of Search ................ 192/0.076, 3.29, 3.3, 192/3.31, 103 F

[56] References Cited

U.S. PATENT DOCUMENTS 4,457,411 7/1984 Hiramatsu ........................ 192/0.076
4,582,185 4/1986 Grimes et al. .................... 192/0.076

FOREIGN PATENT DOCUMENTS 180156 10/1984 Japan ................................ 192/3.29
200861 11/1984 Japan ................................ 192/3.3

Primary Examiner—Leslie A. Braun
Assistant Examiner—David Testardi
Attorney, Agent, or Firm—Lyon & Lyon

[57] ABSTRACT

A vehicular transmission having a fluid torque converter of the type in which a clutch is provided for mechanically connecting the input and output sides of a fluid torque converter above certain vehicle speeds for improved operation and economy and in which the clutch is operated within a predetermined vehicular speed range by such a relatively low engaging force as to allow slippage of said clutch for minimizing vibration. A control system causes the engaging force of the clutch to be increased more than that which is normally established below a reference value of small throttle valve opening for providing a braking effect by the engine. The control system also may provide for stopping the increase in engaging force at small throttle valve openings when the r.p.m. of the output side of the fluid torque converter falls below the r.p.m. at the input side, such as during a transition from a steep downward slop to a gentle downward slope, or when low oil temperature and high oil viscosity would cause operation too abruptly.

13 Claims, 12 Drawing Sheets a.r.v. = atmospheric release valve a.r.v. = atmospheric release valve a.r.v. = atmospheric release valve a.r.v. = atmospheric release valve

CONTROL FOR THE CLUTCH OF A FLUID TORQUE CONVERTER IN A VEHICULAR TRANSMISSION

The present invention relates to the transmission of a vehicle and, in particular, to the controls for the clutch in the fluid torque converter which clutch is provided for mechanically connecting the input and output sides of the fluid torque converter under certain operating conditions.

It is well known to provide a clutch of this kind in a transmission torque converter for directly connecting the input and output sides of the fluid torque converter during high-speed cruising of the vehicle to prevent any slippage of the torque converter and thereby to improve the fuel economy of the vehicle. In order to further improve fuel economy, it is desirable to expand the operating range of the clutch to include lower speeds of vehicle operation whenever possible.

However, if the clutch is operated to directly connect the input and output of the torque converter at engine speeds that are too low, the torque fluctuations from the engine are transmitted to the output side of the torque converter and engine thereby causing vibrations in the vehicle. Therefore, it also has become known in the prior art to apply a relatively low engaging force to the clutch in low-speed engine operation so as to allow slippage of the clutch whereby the engine torque fluctuations are absorbed through the clutch slippage (as disclosed in Japanese Patent Application No. P 60-193067, for example).

The prior art clutch systems described above have the problem that when the accelerator pedal is released for deceleration while the vehicle is running within a predetermined speed range in which the clutch normally is operated in its slipping state, a sufficient braking effect produced by the engine is not attained due to the slippage of the clutch. While the provision of a control to cause the clutch to directly connect the input and output of the torque converter during deceleration will provide the desired braking effect, this can create other problems during some operation conditions.

The present invention has an object to provide a clutch controlling method and apparatus which solves the various problems with the prior art.

According to the present invention, a vehicular torque converter of the type in which a clutch for mechanically connecting the input and output sides of the fluid torque converter connected between an engine and a transmission is operated within a predetermined vehicular speed range normally by such a relatively low engaging force as to allow slippage of said clutch but when the throttle valve opening of the engine falls below a predetermined reference value, even though the vehicular speed falls within said predetermined range, the engaging force of said clutch is increased to directly couple the input and output sides during deceleration, as evidenced by the small throttle valve opening.

Thus, when the accelerator pedal is released for deceleration, the clutch has its engaging force abruptly increased to reduce or prevent slippage because the throttle valve opening falls below the predetermined value whereby a braking effect is produced by the engine.

According to another embodiment of this invention, the control system for the torque converter clutch allows slippage of the clutch in an apparent decelerating condition by either stopping the increased engaging force or stopping the operation of the clutch itself when the r.p.m. of the output side of the fluid torque converter falls below the r.p.m. of the input side even though the throttle valve opening is small, as may occur during a transition between maximum deceleration or engine braking down a steep road slope and a moderate or flat slope when normal speed is being maintained and before actual acceleration is resumed.

According to still another embodiment of this invention, the control system for the torque converter clutch causes slippage of the clutch to occur before the engine r.p.m. drops below a predetermined amount during rapid deceleration, such as during braking, even during low temperature operation to prevent engine stall that would otherwise occur when the vehicle is brought to an abrupt stop with the clutch direct coupled.

These and other objects and advantages of the present invention will be readily apparent to those skilled in the art from the following description and the accompanying drawings, wherein.

Figure 1:
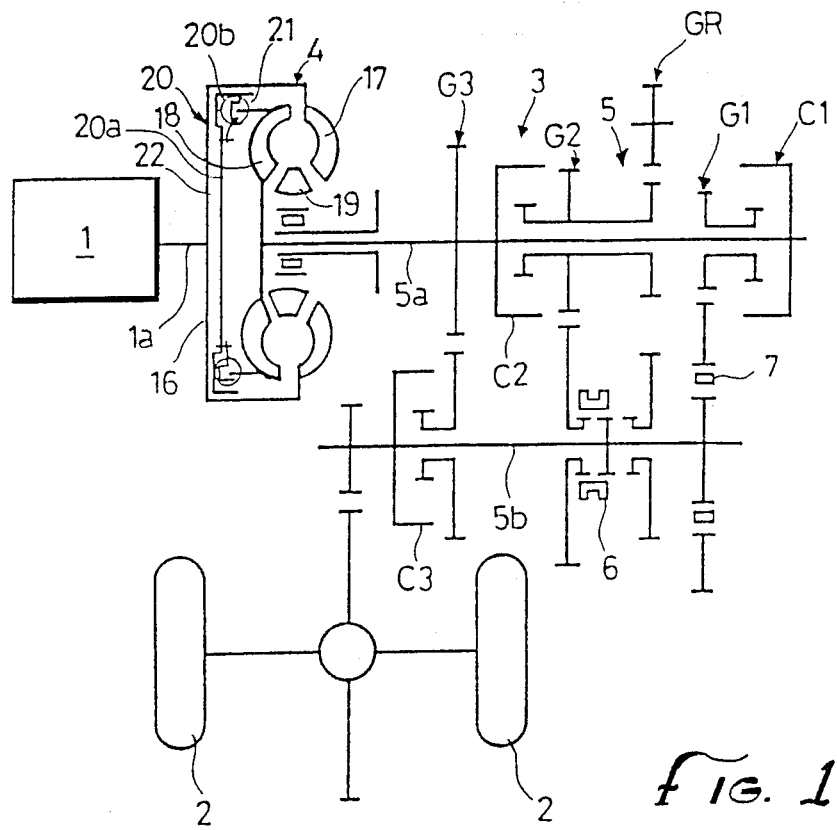
FIG. 1 is a diagram showing the vehicular transmission with a fluid torque converter equipped with the clutch which is to be controlled by the method and apparatus of the present invention.

Referring now to FIG. 1, a conventional vehicular transmission assembly is diagrammatically shown in which each of the embodiments of the present invention may be used. The vehicle engine 1 is connected to the driving wheels 2 through a vehicular transmission 3 which has a fluid torque converter 4 and a multispeed transmission 5. As shown, the multispeed transmission 5 has three forward speed changes and one reverse speed change, although obviously the transmission may have more or fewer speed changes without departing from this invention.

The automatic multispeed transmission 5 is equipped with transmission gear trains G1, G2 and G3 for 1st to 3rd forward speed stages and a transmission train GR for one reverse speed stage between an input shaft 5a connected to the torque converter 4 and an output shaft 5b connected to the driving wheels 2. The 1st to 3rd speed oil pressure operated clutches C1, C2 and C3 are coupled in the forward driving transmission trains G1, G2 and G3, respectively, so that said respective transmission trains G1, G2 and G3 may be selectively established when said respective oil pressure operated clutches C1, C2 and C3 are applied. On the other hand, the reverse driving transmission train GR shares the 2nd speed oil pressure operated clutch C2 with the 2nd speed transmission train G2 so thatit may be established by the rightward movement, as viewed in FIG. 1, of such a selector gear 6 to the reverse driving side as is provided for selecting the two transmission trains G2 and GR. A one-way clutch 7 is coupled in the 1st speed transmission train G1 to allow the output shaft 5b to overrun.

Figure 2:
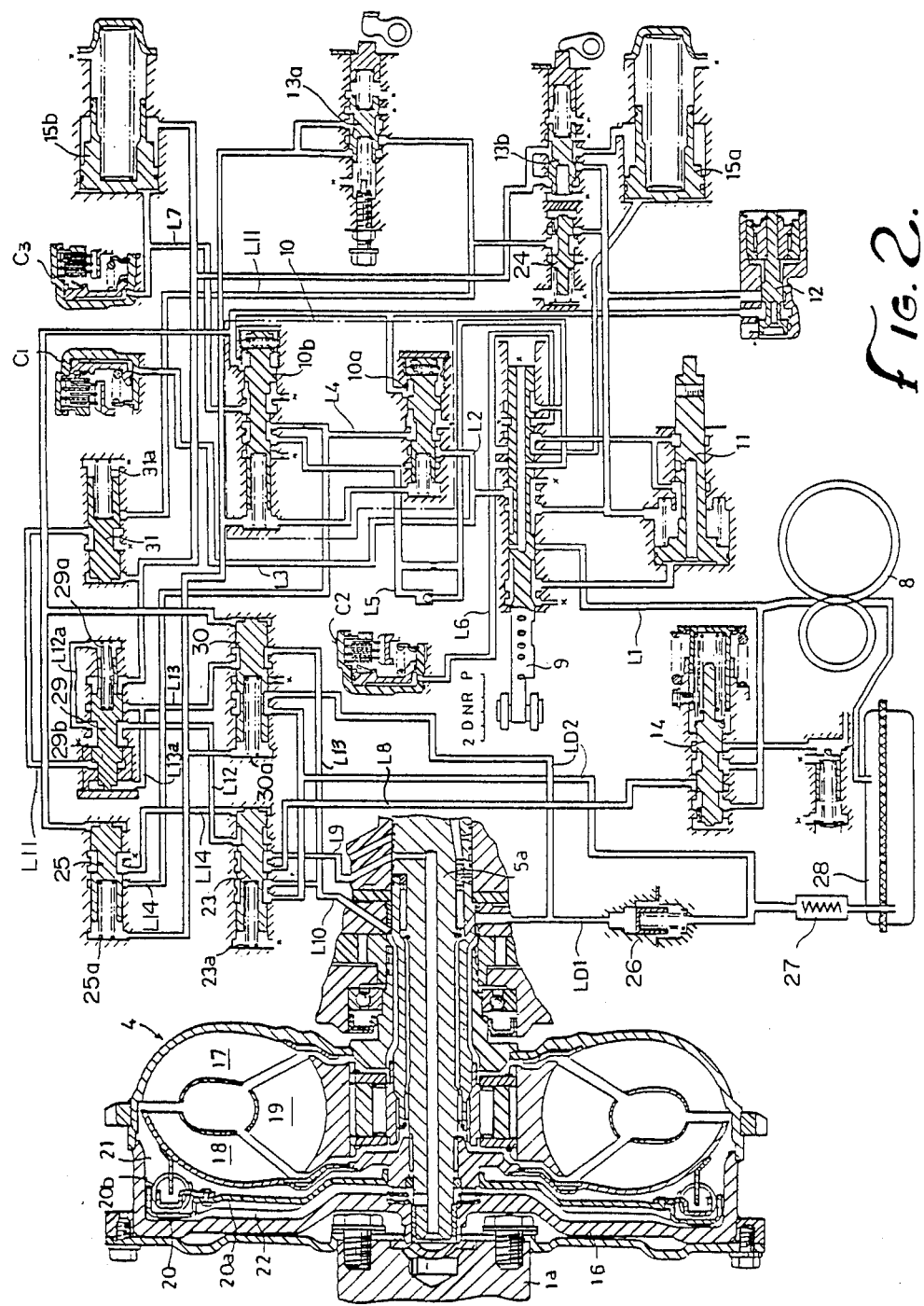
FIG. 2 is a diagramatic illustration of the transmission hydraulic circuit equipped with the apparatus for executing the method of the present invention.

The aforementioned respective oil pressure operated clutches C1, C2 and C3 have their oil supplies and drainages controlled by an hydraulic oil pressure circuit such as the one shown in FIG. 2. The oil pressure circuit of FIG. 2 includes an oil pressure source 8 having an oil pump; a manual valve 9 which can be shifted to any of five positions of "P" for parking, "R" for reverse, "N" for neutral, "D" for automatic speed changes and "2" for 2nd speed holding; a shift valve 10 to be shifted in accordance with the speed of the vehicle and the engine throttle valve opening degree; and a servo-valve 11 connecting the aforementioned selector gear 6 for effecting changeover between the forward and reverse drives. In the "D" position of the manual valve 9, a 1st oil supply line L1 leading to the oil pressure source 8 is connected to a 2nd oil line L2 leading to the shift valve 10 so that the oil is supplied both to the 1st speed oil pressure operated clutch C1 via a 3rd oil line L3 branched from said second oil line L2 and to the respective 2nd and 3rd speed oil pressure operated clutches C2 and C3 via the shift valve 10. Here, this shift valve 10 is composed of a 1st shift valve 10a positioned at an upstream side for 1st-2nd speed changes and a 2nd shift valve 10b positioned at a downstream side for 2nd-3rd speed changes such that the 1st and 2nd shift valves 10a and 10b are interconnected via an intermediate 4th oil line L4. These respective shift valves 10a and 10b each have one (righthand) end subjected to a governor pressure coming from a governor valve 12 related to the vehicular speed and the other (lefthand) end subjected to a throttle pressure coming from a first throttle valve 13a related to the throttle valve opening degree of the engine. If the vehicular speed increases over the 1st-2nd speed change characteristic curve, as indicated at X1 in FIG. 3, the 1st shift valve 10a moves from the righthand 1st speed position to the lefthand 2nd speed position so that the 2nd oil line L2 is connected via the 4th oil line L4 to a 5th oil line L5 at the exit side of the 2nd shift valve 10b to effect the oil supply to the 2nd speed oil pressure operated clutch C2 via a 6th oil line L6 connected to the 5th oil line L5 in the "D" position of the manual valve 9. If the vehicular speed further increases over the 2nd-3rd speed change characteristic curve, as indicated at X2 in FIG. 3, the 2nd shift valve 10 moves from the righthand 2nd speed position to the lefthand 3rd speed position so that the 4th oil line L4 has its connection changed over from the 5th oil line L5 to a 7th oil line L7 leading to the 3rd speed oil pressure operated clutch C3 thereby to effect the oil supply to the 3rd speed oil pressure operated clutch C3.

A regulator valve 14 is provided for regulating at a predeterminedline pressure, the pressure of the oil supply from the oil pressure source 8. 2nd and 3rd speed accumulators 15a and 15b are connected to the 2nd and 3rd speed oil pressure operated clutches C2 and C3, respectively. The throttle pressure according to the engine throttle valve opening degree is applied as a back pressure from a 2nd throttle valve 13b to the respective accumulators 15a and 15b.

The aforementioned fluid torque converter 4 is equipped, in its internal space defined by an input casing 16 disposed at one side 'nd connected to the crankshaft 1a of the engine 1 and a pump vane 17 disposed at the other side and connected to the input casing 16, with a turbine vane 18 connected to the input shaft 5a of the transmission 5 and stator vanes 19 between the two vanes 17 and 18. The torque converter 4 is further equipped with a freely applicable and releasable clutch 20 for mechanically connecting the input side of said torque converter 4, e.g., the input casing 16 and the output side of the same, e.g., the turbine vane 18. A fluid torque transmission is established by the internal fluid circulation among the aforementioned vanes 17, 18 and 19 when said clutch 20 is released, and a mechanical torque transmission is established through said clutch 20 when this clutch 20 is applied.

The clutch 20 may be of any conventional type, such as a multiple disk type friction clutch, but is shown and described herein as a single disk type friction clutch. The friction clutch 20 has its clutch disk 20a axially movable in the gap between the input casing 16 and the turbine vane 18 and connected to this turbine vane 18 through a damper spring 20b. The internal space of said torque converter 4 is partitioned by the clutch disk 20a into a vane accommodating chamber 21 located at one side and a back pressure chamber 22 located between the other side and the input casing 16. The friction clutch 20 can be freely switched by a later-described control valve 23 between a released state, in which the oil is supplied from the back pressure chamber 22 to said internal space, and an applied state in which the oil is supplied from the vane accommodating chamber 21. In the clutch applied state, the clutch disk 20a is brought into frictional engagement with said input casing 16 by the engaging force corresponding to the difference between the internal pressure (which will be designated as Pa) of the accommodating chamber 21 and theinternalpressure (which will be designated as Pb) of the back pressure chamber 22.

The aforementioned control valve 23 can be switched between a righthand clutch released position (as shown), in which an 8th oil line L8 leading to the regulator valve 14 is connected to a 9th oil line L9 leading to the back pressure chamber 22 to effect the oil supply to this back pressure chamber 22, and a lefthand clutch applied position in which the 8th oil line L8 is connected to a 10th oil line L10 leading to the vane accommodating chamber 21 to effect the oil supply to this accommodating chamber 21. To the oil chamber at the righthand side of said control valve 23, there is connected an 14th oil line L14 which is branched from the 4th oil line L4 which in turn acts as an oil supply line to be connected to the 2nd and 3rd speed oil pressure operated clutches C2 and C3 through the second shift valve 10b. When the line pressure is applied, upon establishment of the 2nd and 3rd speed transmission trains G2 and G3, to said oil chamber from the 4th oil line L4 via the 14th oil line L14, said control valve 23 is switched to the clutch applied position against the action of its left end spring 23a. Moreover, in the 14th oil line L14, there is disposed a shut-off valve 25, which is biased both in the leftward opening direction by the governor pressure coming from the governor valve 12 and in the rightward closing direction by the throttle pressure coming from the 1st throttle valve 13a so that it may be opened in a higher speed regionthan a curve A of FIG. 3. Thus, in said region, the control valve 23 is switched to the clutch applied position to apply the clutch 20.

Again referring to FIG. 2, a 1st regulator valve 26 is constructed of a check valve disposed in a 1st drain line LD1 leading to the vane accommodating chamber 21 for regulating the pressure Pa at a relatively high predetermined level. The drain line LD1 is connected through an oil cooler 27 to an oil reservoir 28.

The operating state of the clutch 20 is switched, in accordance with the changes in the engaging force due to the increase or decrease of the difference between the pressures Pa and Pb, between a directly connecting state to directly connect the input and output sides of said clutch 20 and a slipping state to allow a slippage between the input and output sides. The clutch 20 is so constructed as to variably control that pressure difference, i.e., the engaging force in accordance with the running state, as will be described in the following.

More specifically, there are provided a 12th oil line L12, which is connected to the 9th oil line L9 leading to the back pressure chamber 22 when in the clutch applying position of the control valve 23, and a 13th oil line L13 which is branched through valve 30 from the 10th oil line L10 leading to the vane accommodating chamber 21. These two oil lines L12 and L13 are connected via a 2nd regulator valve 29 to form a communication passage for communicating the two chambers 21 and 22. Also there are provided a 2nd drain line LD2, which is in parallel with the 1st regulator valve 26 in the 1st drain line LD1, with the 2nd drain line LD2 extending to and from a control valve 30 for opening said 2nd drain line LD2 and the 13th oil line L13 thereby forming the aforementioned communication passage when in the slipping state of the clutch 20 and for closing the two oil lines LD2 and L13 in the directly connected state. More specifically, said control valve 30 is biased in the leftward closing direction by the governor pressure coming from the governor valve 12 and in the rightward opening direction by the action of a spring 30a and by the throttle pressure coming from the 1st throttle valve 13a so that it is switched between the open position (i.e., the shown position), in which the two oil lines LD2 and L13 are opened in a lower speed region than a curve B of FIG. 3, and a closed position in which the same two oil lines LD2 and L13 are closed in a higher speed region.

The aforementioned 2nd regulator valve 29 is constructed as a pressure differential responding type, in which it is biased in the rightward opening direction by the oil pressure acting via a pilot oil line L13a branched from the 13th oil line L13, i.e., the pressure Pa, and in biased in the leftward closing direction by the oil pressure acting via a pilot oil line L12a leading to said 12th oil line L12, i.e., the pressure Pb. Said 2nd regulator valve 29 is further biased in the closing direction by the action of a spring 29a and the throttle pressure (which will be denoted as P$\theta$) coming from the 2nd throttle valve 13b and in the opening direction by the output pressure (which will be denoted at Pm) of a modulator valve 24 located upstream of the 1st throttle valve 13a.

Figure 4:
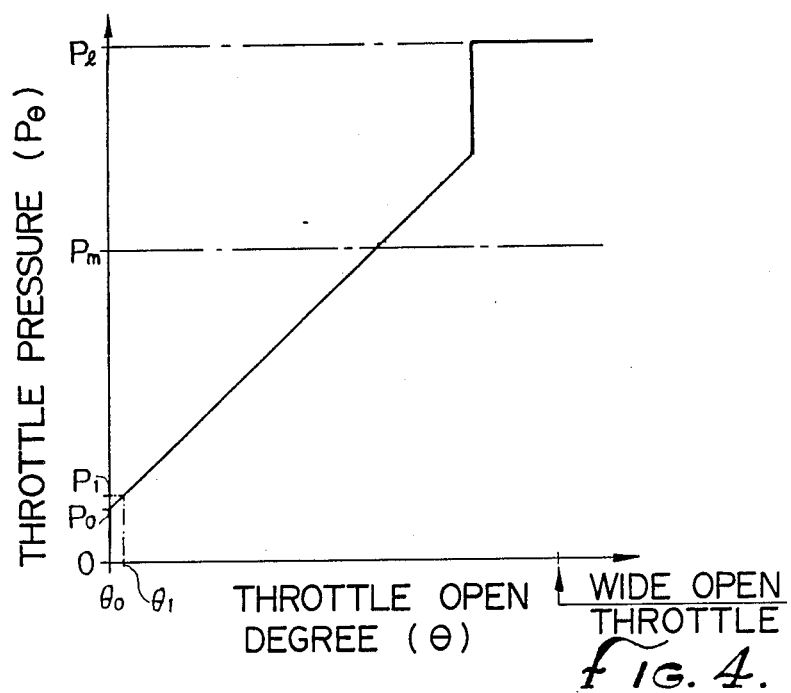
FIG. 4 is another graph showing the output characteristics of a throttle valve incorporated into the hydraulic circuit of FIG. 2.

Incidentally, the pressure P$\theta$ changes, as shown in FIG. 4, in accordance with the magnitude of the opening of the air intake throttle valve (the "throttle open degree") of the engine, whereas the pressure Pm is set at a lower level than a line pressure Pl.

Figure 3:
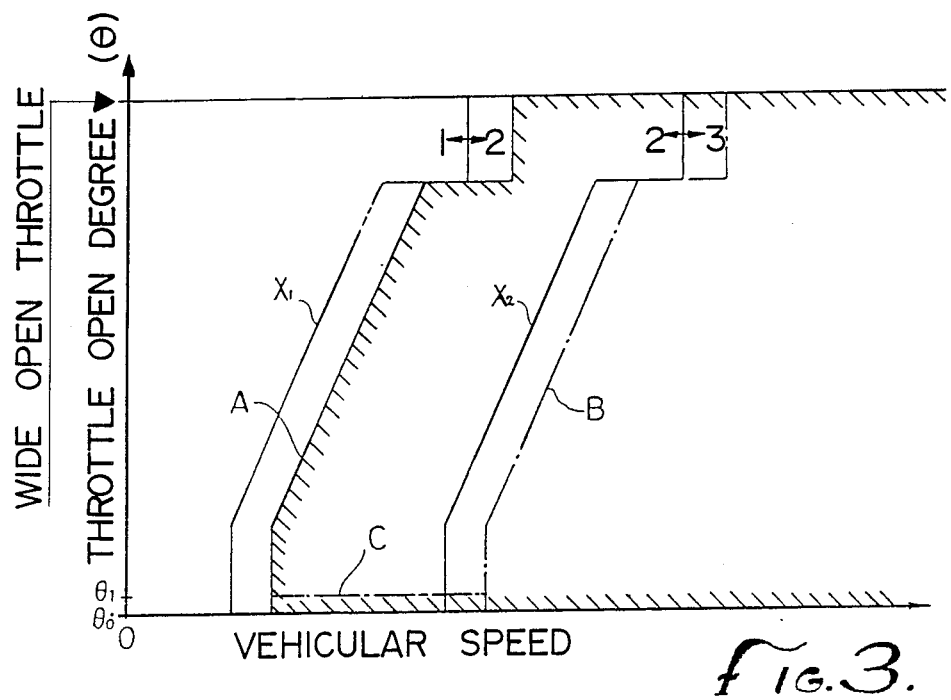
FIG. 3 is a graph showing the operating characteristics of the clutch.

In the high speed region to the right of the curve B of FIG. 3, the control valve 30 is switched to the closed position to close the 2nd drain line LD2 and the 13th oil line L13 so that the pressure Pa is held at a relatively high level determined by the 1st regulator valve 26. Moreover, the input of the pressure Pa to the 2nd regulator valve 29 via the 13th oil line L13 is interrupted to shift the 2nd regulator valve 29 to the closed side and to connect the 12th oil line L12 to a drain port 29b of said valve 29 so that the pressure Pb takes a value near the atmospheric pressure level. This enlarges the difference between the pressures Pa and Pb to increase the clutch engaging force so that the clutch 20 operates in its directly connected state. In a relatively low running speed of the vehicle between the curves A and B of FIG. 3, however, the control valve 30 is switched to the open position to open the 2nd drain line LD2 and the 13th oil line L13 thereby to drain the oil in the vane accommodating chamber 21 from the second drain line LD2 to bypass the 1st regulator valve 26 so that the pressure Pa takes a relatively low pressure determined by the passage resistance of said 2nd drain line LD2. On the other hand, the back pressure chamber 22 is fed with the oil pressure regulated by the 2nd regulator valve 29 via the communication passage which is formed of the 13th oil line L13 and the 12th oil line L12. As a result, the difference between the pressures Pa and Pb is reduced, as compared with that in the directly connected state, so that the clutch 20 operates in the slipping state.

Assuming that the area of the 2nd regulator valve 29 receiving the pressures Pa and Pb is designated as S1, that the receiving area of the pressures P$\theta$ and Pm is designated as S2, and thatthe force of the spring 29a is designated as F, then the relationship among the forces acting upon the 2nd regulator valve 29 are expressed by the following equation:

$$PaS1 + PmS2 = PbS1 + P\theta S2 + F.$$

Hence, the following relationship holds:

$$Pa - Pb = S2/S1 \cdot P\theta + F/S1 - S2/S1 \cdot Pm \tag{1}$$

Figure 5:
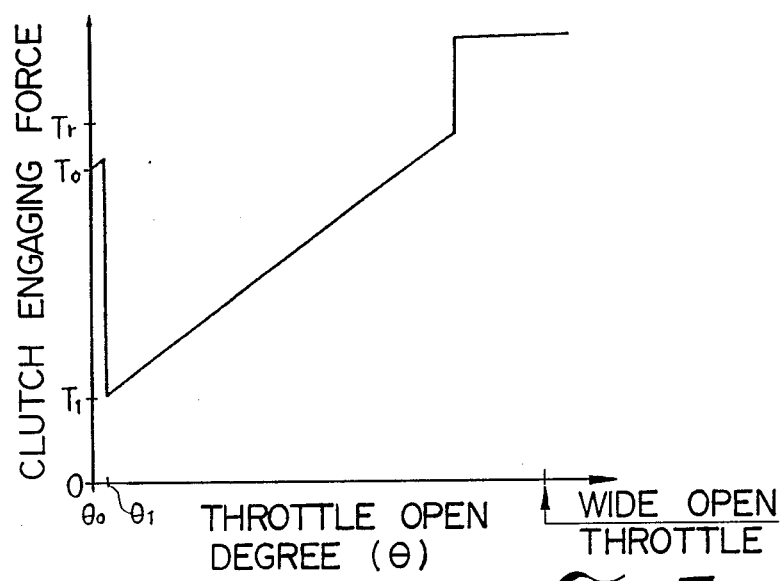
FIG. 5 is still another graph showing the changing characteristics of the engaging force of the clutch.

As a result, in the vehicular speed range in which the clutch 20 operates in the slipping state, the clutch engaging force increases, as shown in FIG. 5, in conformity with the equation (1) in accordance with the increase in the throttle open degree of the engine.

As a result, the clutch engaging force increases in accordance with the increase in the output torque of the engine due to the increase in the throttle open degree so that the speed ratio of the fluid torque converter is held constant at about 0.92 to 0.93 independently of the change in the output torque. At the same time, the torque fluctuations, which might otherwise become excessive in the low speed range, are absorbed through the slippage of the clutch 20 to prevent the vehicular body from vibrating.

The control method thus far described is not particularly different from the disclosure of Japanese Patent Application No. 60-193067 proposed previously by the same assignee as this application except that the pressure Pm is applied to the second regulator valve 29. In the present embodiment, however, in the 11th oil line L11 for applying the pressure Pm to the second regulator valve 29, there is disposed a shut-off valve 31 which is to be closed, when the throttle open degree is smaller than a predetermined value $\theta1$, so that the clutch engaging force is increased to a level more than normal for said level $\theta1$ when the throttle open degree is smaller than the level $\theta1$ even if the vehicular speed falls within a range in which the clutch 20 operates in the slipping state.

More specifically, said shut-off valve 31 is biased in the rightward open direction, as shown, by the pressure $P\theta$ and in the leftward closing direction by the action of a spring (31a) so that it may be closed when the throttle open degree drops to a level lower than a predetermined low level $\theta1$ near a fully closed degree (i.e. throttle open degree zero, "$\theta0$"). When said shut-off valve 31 is closed, the input of the pressure Pm to the 2nd regulator valve 29 via the 11th oil line L11 is interrupted to reduce the term Pm of the aforementioned equation (1) to zero so that the clutch engaging force is promptly increased.

If the pressure $P\theta$ is designated at P0 for the throttle open degree at the fully closed level $\theta0$ and at P1 for the throttle open degree at the predetermined level $\theta1$, the difference between the clutch engaging force T0 at the fully closed level $\theta0$ and the clutch engaging force T1 at the predetermined level $\theta1$ (i.e., before the shut-off valve 31 is closed) is expressed by the following equation with the pressure receiving area S0 of the clutch disk 20a:

$$T0 - T1 = S0 [(S2/S1 \cdot P0 + F/S1) - (S2/S1 \cdot P1 + F/S1 - S2/S1 \cdot Pm)]$$
$$= S0 S2/S1 [Pm + (P0 - P1)].$$

In this case, as is apparent from FIG. 4, P0≈P1, and Pm>P0, P1 so that the force T0 takes a far larger value than the force T1.

In a region of smaller throttle open degree than a curve C of FIG. 3, the clutch 20 becomes more reluctant to slip than in the region of larger throttle open degree so that a sufficient braking effect by the engine can be attained during a vehicle deceleration with the accelerator pedal being released.

Incidentally, in this case the engaging force T0 can be set at a level Tr or higher to transmit the counter drive torque by 100% from the driving wheels 2 so that the clutch 20 may be brought into its completely directly connected state. If, however, the level T0 is set at a level slightly smaller than Tr, then the speed ratio of the fluid torque converter 4 may take a value of about 1.02 to 1.03, whereby the braking effect by the engine can advantageously be maintained at an excellent level while preventing the vehicular body from vibrating when the engine conducts the braking effect.

While the counter drive torque is being transmitted, the revolutions of the driving wheels 2 do not periodically fluctuate very much, in contrast to when they are being driven from the engine 1, by reason of the fluctuations of the load among the strokes of the engine 1 which causes objectionable vibration of the vehicular body. However, if it is so desired, even those minor vibrations that may occur during such counter drive torque application may be absorbed by controlled slippage of the clutch 20, as described above.

In summary, as has been described hereinbefore, according to the present invention when the deceleration is to be effected by partially or fully releasing the accelerator pedal and thereby dropping the throttle open degree to a lower degree than the predetermined level even for the running speed range in which the clutch is applied in its slipping state, the engaging force of the clutch can be abruptly increased to provide a sufficient braking force by the engine. By setting the increased amount of the engaging force at a suitable value, moreover, there can be attained another effect that the vibrations of the vehicular body being braked by the engine can be suppressed to improve the riding comfort.

Figure 6:
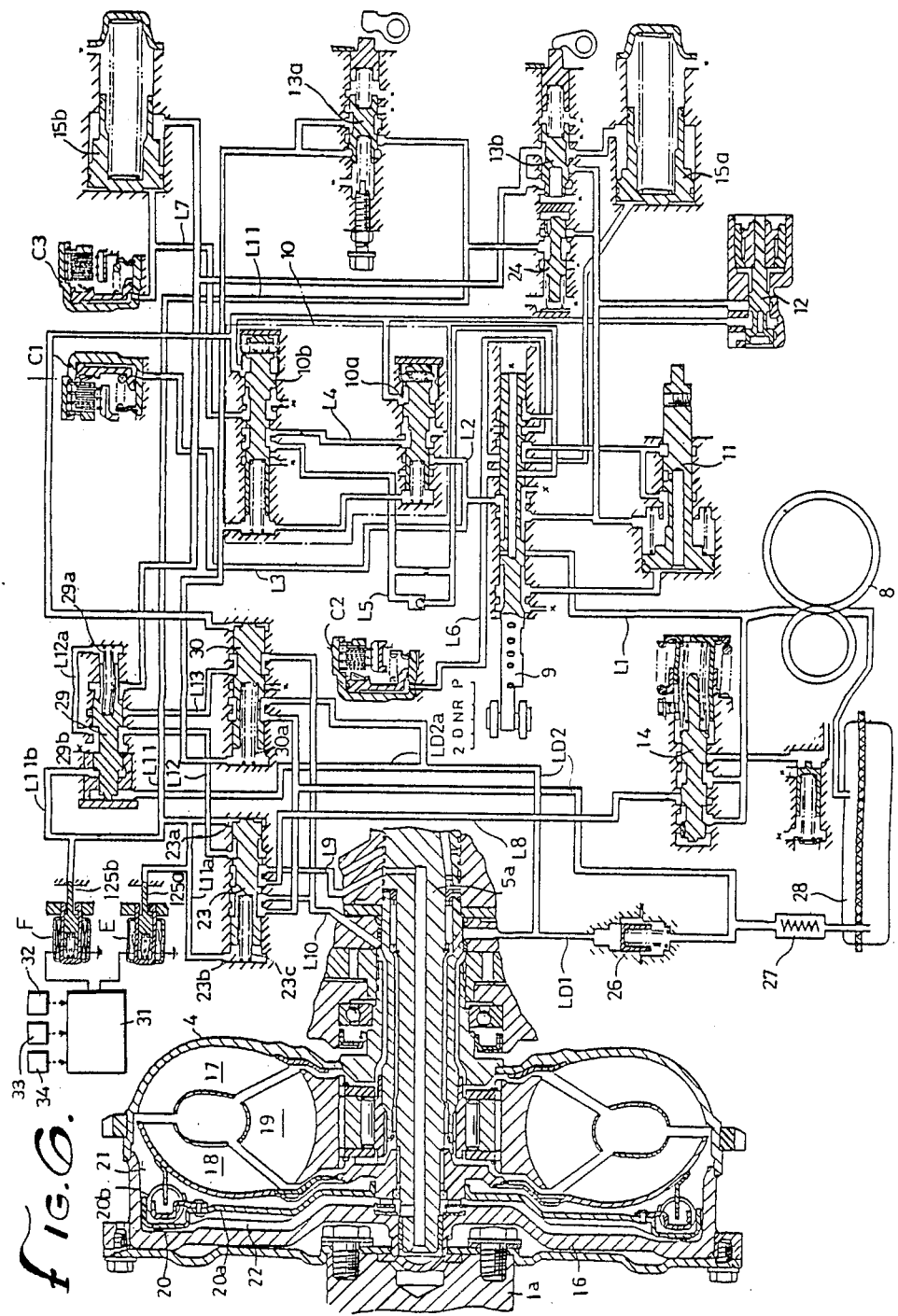
FIG. 6 is a diagramatic illustration of a second embodiment of the hydraulic circuit of the transmission equipped with an electronic control circuit acting as the apparatus for executing the present invention.

Referring now to FIGS. 6 through 11 which relate to the second embodiment of this invention, all of numerals and letters that are the same as those used in FIGS. 1 through 5 refer to components and the like that are the same in type and function as heretofore described and, except to the extent necessary for an understanding of this second embodiment, they will not be described again. The control system illustrated in FIG. 6 is substantially similar t that shown in FIG. 2 except as now described. Referring first to control valve 23, its right-hand oil chamber 23a is supplied with pressurized oil (at output pressure Pm) directly from the modulator valve 24 through the 11th oil line L11 rather than, as in FIG. 2, indirectly through valve 25 which is not included in the system of FIG. 6. The lefthand oil chamber 23b is connected to a branch oil line L11a having an orifice therein between oil line L11 and chamber 23b. That oil line L11a is connected to a 1st atmospheric release valve 125a of an electromagnetic type so that the control valve 23 is switched, when the release valve 125a is opened (shifted to the left) to the clutch applied position by the pressure difference between the two oil chambers 23a and 23b against the action of a spring 23c thereby to operate the clutch 20.

Again, as in FIG. 2, the system of FIG. 6 includes a 1st regulator valve 26 having a check valve disposed in a 1st drain line LD1 leading to the vane accommodating chamber 21 for regulating the pressure Pa at a relatively high predetermined level. The operating state of the clutch 20 is switched, in accordance with the changes in the engaging force due to the increase or decrease of the difference between the pressures Pa and Pb, between a directly connecting state to directly connect the input and output sides of said clutch 20 and a slipping state to allow a slippage between the input and output sides and the clutch 20 variably controls that pressure difference, i.e., the engaging force in accordance with the running state, all as will be described with respect to FIG. 6.

The aforementioned 2nd regulator valve 29 in this system of FIG. 6 is again constructed as a pressure differential responding type, in which it is biased in the rightward opening direction by the oil pressure acting via a pilot oil line LD2a branched from the 2nd drain line LD2 , i.e., the pressure Pa and in the leftward closing direction by the oil pressure acting via a pilot oil line L12a leading to said 12th oil line L12 , i.e., the pressure Pb. The 2nd regulator valve 29 is further biased in the closing direction by the action of a spring 29a and the throttle pressure (which will be denoted as $P\theta$) coming from the 2nd throttle valve 13b and in the opening direction by the pressure Pm supplied from the 11th oil line L11 via a branch oil line L11b with an orifice. A 2nd atmospheric release valve 125b is connected to that branch oil line L11b.

As described with respect to the first embodiment, again the pressure Pθ changes, the same as shown in FIG. 4, in accordance with the throttle open degree of the engine, whereas the pressure Pm is set at a lower level than a line pressure Pl.

The aforementioned 1st and 2nd atmospheric release valves 125a and 125b are controlled by an electronic control circuit 31 which is equipped with a microcomputer. This control circuit 31 is made responsive to: a signal coming from throttle open degree detecting means 32 related to the throttle open degree; a signal from vehicular speed detecting means 33 related to the vehicular speed; and a signal from engine r.p.m. detecting means 34 related to the r.p.m. of the engine for opening the 1st atmospheric release valve 125a in the clutch applying region (as cross-hatched on a higher speed side of curve A in FIG. 7) to apply the clutch 20, as described later in detail, and for opening the 2nd atmospheric release valve 125b only in case later-described special conditions occur.

Figure 7:
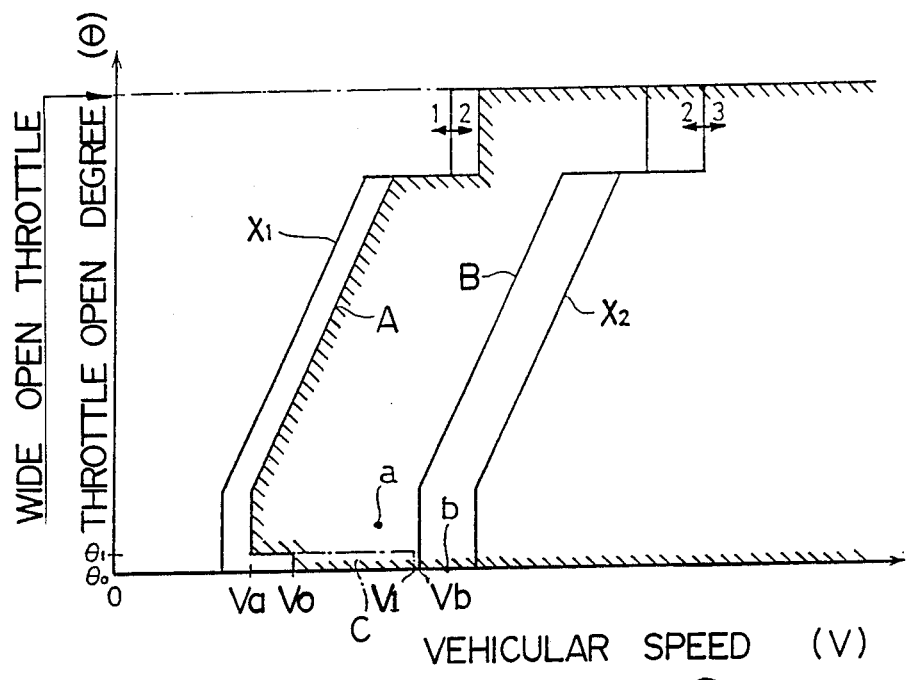
FIG. 7 is a graph showing the operating characteristics of the clutch in the second embodiment of FIG. 6.

Here, in the higher speed range to the right of the curve B of FIG. 7, as has been described above, tne control valve 30 is switched to the closed position to close the 13th oil line L13 and the 2nd drain line LD2. As a result, the oil is not fed from the 13th oil line L13 to the 12th oil line L12 but flows out from the 12th oil line L12 into the drain port 29b of the 2nd regulator valve 29 so that the pressure Pb takes a level near atmospheric pressure. At the same time, the oil drainage through the 2nd drain line LD2 is interrupted so that the pressure Pa is held at a relatively high level determined by the 1st regulator valve 26. This enlarges the difference between the pressures Pa and Pb to increase the clutch engaging force so that the clutch 20 operates in its directly connected state, similar to the system of the first embodiment.

In a running speed of the vehicle between the curves A and B of FIG. 7, the control valve 30 is switched to the open position to open the 2nd drain line LD2 and the 13th oil line L13 thereby to drain the oil in the vane accommodating chamber 21 from the second drain line LD2 to bypass the 1st regulator valve 26 so that the pressure Pa takes a relatively low pressure determined by the passage resistance of said 2nd drain line LD2. On the other hand, the back pressure chamber 22 is fed with the oil pressure regulated by the 2nd regulator valve 29 via the communication passage which is formed of the 13th oil line L13 and the 12th oil line L12. As a result, the difference between the pressures Pa and Pb is reduced, as compared with that in the directly connected state, so that the clutch 20 operates in the slipping state. The formulas representing this operation and its characteristics are the same as set forth above for the first embodiment.

As with the first embodiment, the clutch engaging force increases in accordance with the increase in the output torque of the engine due to the increase in the throttle open degree so that the speed ratio of the fluid torque converter is held constant at about 0.92 to 0.93 independently of the change in the output torque. At the same time, the torque fluctuations, which might otherwise become excessive in the low speed range, are absorbed through the slippage of the clutch 20 to prevent the vehicular body from vibrating.

However, with this second embodiment, when the throttle open degree falls below a predetermined reference level (which will be referred to as $\theta1$) slightly larger than the fully closed level (which will be referred to as $\theta0$) even in the vehicular speed range in which the clutch 20 is operated in its slipping state, i.e., when the running state shifts to the lower throttle open degree region (i.e., the C region of FIG. 7) in said vehicular speed range, the 2nd atmospheric release valve 125b is opened to shut off the input of the pressure Pm to the 2nd regulator valve 29. According to this operation, the pressure Pm drops to 0 so that the clutch engaging force is accordingly increased.

When the r.p.m. of the output side of the fluid torque converter 4 falls below that of the input side even in the C region, i.e., when the speed ratio e (i.e., the r.p.m. of the output side to the r.p.m. of the input side) of the fluid torque converter 4 is equal to or smaller than 1, the 2nd atmospheric release valve 125b is closed to stop the increase in the clutch engaging force.

The aforementioned throttle open degree detecting means 32 may be constructed of a potentiometer or the like, which is associated with the opening or closing of the throttle valve of the engine or the motion of the accelerator pedal. The vehicular speed detecting means 33 may be constructed of a reed switch or the like, which is made coactive with a magnetic rotor made rotatable in association with the transmission output shaft 5b for generating a pulse signal proportional to the r.p.m. of theoutput shaft 5b. Further, the engine r.p.m. detecting means 34 may be constructed of a sensor for detecting the ignition pulses of the engine 1 for generating a pulse signal proportional to the engine r.p.m. Thus, the speed ratio e is determined by detecting the r.p.m. of the crankshaft 1a at the input side of the fluid torque converter 4 in terms of the signal coming from said engine r.p.m. detecting means 34 and by calculating the r.p.m. of the input shaft 5a from both the r.p.m. of the output shaft 5b detected in terms of the signal from said vehicular speed detecting means 33 and the established reduction ratio of the transmission train. As an alternative, the r.p.m. of the input shaft 5a can be directly detected. Without determining the speed ratio e, the magnitude may be judged by directly comparing the r.p.m. of the crankshaft 1a and the r.p.m. of the input shaft 5a. The aforementioned C region shown in FIG. 7 is defined in the range of $\theta < \theta1$ and $V0 < V < V1$ for a throttle open degree $\theta$ and a vehicular speed V. The speed value V1 is slightly smaller than the lower limit Vb of the directly connected range of the clutch 20 defined by the curve B, as will be explained later. Moreover, the curve A is offset to a higher speed side with a range of $\theta < \theta1$ so that the speed value V0 is made larger than the vehicular speed Va for $\theta = \theta1$. This is because it is intended to prevent the engine from being stopped by the operation of the clutch 20 when in the abrupt deceleration to V0 or a lower speed.

Figure 8:
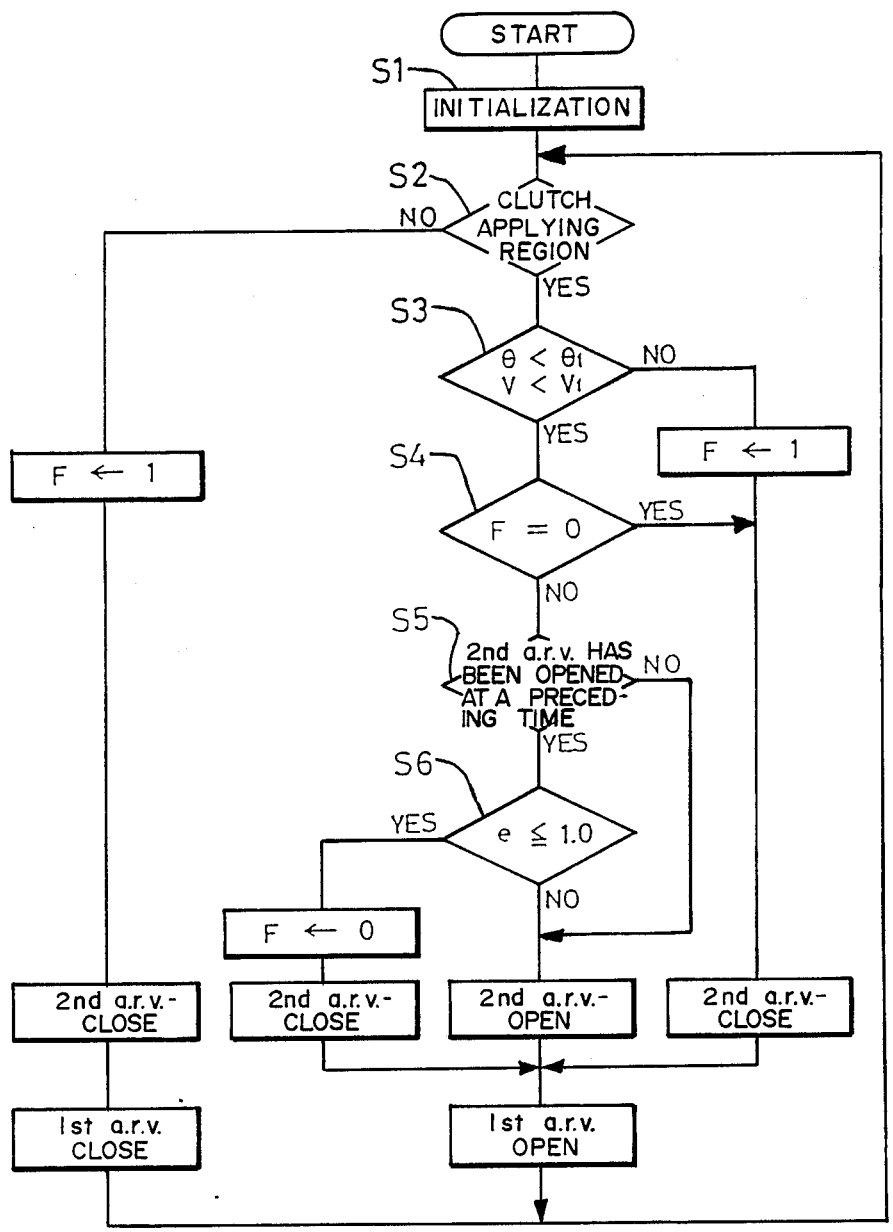
FIGS. 8 to 11 are flow charts showing the respective programs of the electronic control circuit for the second embodiment shown in FIG. 6.

FIG. 8 is a flow chart showing the program of the aforementioned electronic control circuit 31. A step S1 is provided for initialization, at which a flag F is set at 1.

At a step S2, it is judged whether or not the running state falls within the clutch applying region, i.e., within a higher speed region than the curve A of FIG. 7. At a step S3, it is judged whether or not the throttle open degree $\theta$ and the vehicular speed V fall within $\theta < \theta1$ and $V < V1$, i.e., within the C region. At a step S4, it is judged whether or not the flag F is at 0. At a step S5, it is judged whether or not the 2nd atmospheric release valve 125b ("2nd A.R.V.") has been opened at the preceding time. At a step S6, it is judged whether or not the speed ratio e of the fluid torque converter 4 is equal to or smaller than 1. The abbreviation "a.r.v." refers to the 1st or 2nd "atmospheric release valves" 125a or 125b.

If the running state fails to belong to the clutch applying region, the judgment is "NO" at the step S2 so that both the 1st and 2nd atmospheric release valves 125a and 125b are closed. However, if the running state belongs to the clutch applying region, the judgment is "YES" at the step S2 so that the operation proceeds to the step S3. Outside of the C region, the judgment is "NO" at the step S3 and the 2nd atmospheric release valve 125b is held in its closed state whereas the 1st atmospheric release valve 125a is opened so that the control valve 23 is switched to the clutch applied position, as has been described hereinbefore. As a result, the clutch 20 is operated in its slipping state in the vehicular speed range between the curves A and B by the control of the control valve 30 but is operated in its directly connected state in a speed range higher than the curve B.

On the other hand, if the accelerator pedal is released to change the throttle open degree $\theta$ to the value $\theta 0$ so as to effect a deceleration from the running state belonging to the slipping region of the clutch 20, as indicated at a point a in FIG. 7, the running state is shifted to the C region so that the operation proceeds from the step S3 via the step S4 to the step S5, at which the judgment "NO" is made. As a result, the 2nd atmospheric release valve 125b is opened so that the engaging force of the clutch 20 is increased to cause effective braking action by the engine. Subsequently, while the vehicle is coasting in the C region, the steps proceed from S2 to S6 in the order of S3→S4→S5. Since, in this case, the speed ratio e is caused to have a larger value (i.e., e=1.02 to 1.03) than 1 by the counter drive torque from the driving wheels 2, the judgment at the step S6 is "NO" so that the 2nd atmospheric release valve 125b is held in its open state.

However, in case the vehicle is cruising while slightly applying drive torque from the engine with the accelerator pedal being slightly depressed, such as when the slope of a downhill becomes gentle even if the vehicle is running in the C region, the speed ratio e drops to a value equal to or smaller than 1 (i.e., $1 \geq e \geq 0.96$ to 0.97). As a result, the judgment made at the step S6 is "YES" so that the 2nd atmospheric release valve 125b is closed to stop the increase in the engaging force of the clutch 20 thereby to allow the clutch 20 to slip (i.e., e=0.92 to 0.93) whereby the torque fluctuation absorbing function is improved. At this time, the flag F is rewritten to 0, and the subsequent judgment at the step S4 is "YES". As a result, the 2nd atmospheric release valve 125b. is held in its open state to prevent the generation of the vibrations of the vehicular body.

Figure 9:
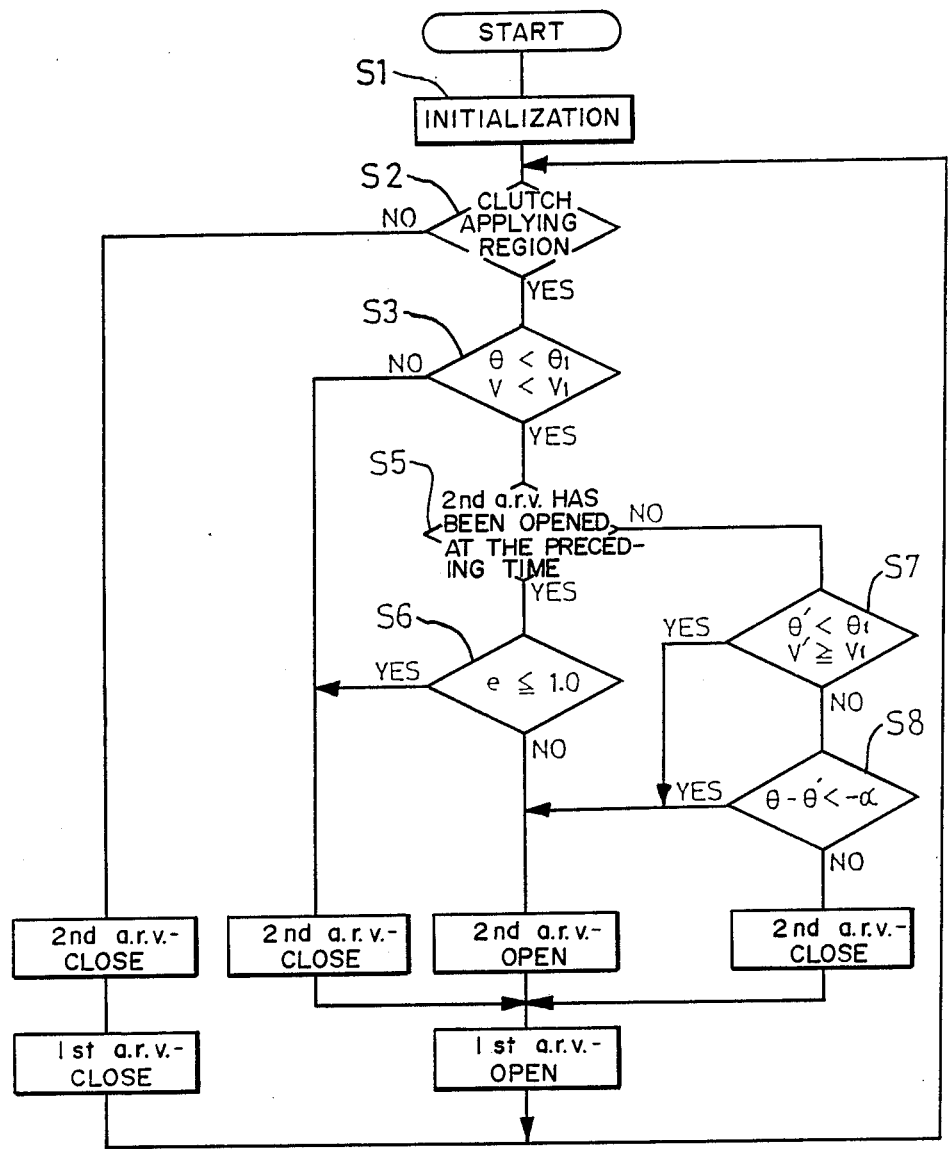

FIG. 9 is a flow chart showing the program for judging the shift to the deceleration state by considering not only the fall of the throttle open degree below $\theta 1$ but also the reducing rate of the throttle open degree to increase the engaging force of the clutch 20. The aforementioned step S4 is omitted, and there are added two steps, i.e., a step S7 of judging whether or not the throttle open degree $\theta'$ and vehicular speed V' just before the latest throttle open degree $\theta$ and vehicular speed V fall within the ranges: $\theta' < \theta 1$ and $V' \geq V1$ and a step S8 of judging whether or not the difference between $\theta$ and $\theta'$ is smaller than a negative predetermined value $-\alpha$, i.e., whether or not the reducing rate of the throttle open degree is higher than a predetermined rate.

According to this modification of FIG. 9, when the vehicles proceeds from a flat road to a gentle downhill so that the driver gradually releases the accelerator pedal to cruise the vehicle in the C region, the operation proceeds from the step S5 via the step S7 to the step S8, at which point the judgment made is "NO" so that the 2nd atmospheric release valve 125b is held in its closed state. Only in the case where the accelerator pedal is abruptly released to its full stroke for a deceleration is the judgment "YES" made at the step S8 so that the 2nd release valve 125b is opened to increase the engaging force of the clutch 20.

As the slope of the downhill from the coasting run in the C region becomes gentler, the accelerator pedal is slightly depressed so that the vehicle is shifted to its cruising run. Then, the judgment "YES" is made at the step S6 so that the 2nd atmospheric release valve 125b is closed. After this, if the slope of the downhill becomes steep so that the accelerator pedal is released to effect the deceleration again, then the judgment "YES" is made at the step S8 so that the 2nd release valve 125b is opened to establish a sufficient braking effect by the engine.

On the other hand, in the case where the vehicle is brought into deceleration from a higher speed than V1 by releasing the accelerator pedal so that the vehicle is shifted with a drop of the vehicular speed into the C region from a point b shown in FIG. 7, in which the clutch 20 is operated in its directly connected state, the judgment "YES" is made at the step S7 to open the 2nd atmospheric release valve 125b so that the sufficient braking effect by the engine can be continuously attained even at a vehicular speed lower than V1.

Incidentally, although it is possible to set the value V1 at the aforementioned value Vb, the control valve 30 may be closed at a lower speed side than V1 due to the tolerances of the hydraulic control parts. In this case, the actual value Vb becomes lower than the value V1 so that the clutch 20 is operated in its directly connected state in the vehicular speed range between Vb and V1. According to the programs of the aforementioned two embodiments of FIGS. 8 and 9, the judgment "YES" is made at the step S6 in said vehicular speed range. Therefore, the value V1 is set at a level slightly smaller than Vb, as has been described above.

The description thus far made is directed to the second embodiment of FIG. 6 in which the 2nd atmospheric release valve 125b is closed to stop the increase in the engaging force of the clutch 20 when the speed ratio e takes a value equal to or smaller than 1, i.e., the r.p.m. of the output side of the fluid torque converter 4 falls below that of the input side even if the running state falls within the C region. In this case, the 1st atmospheric release valve 125a may also be closed to stop the operation of the clutch 20.

In a region of low throttle open degree, the fluctuating ratio of the torque to the steady torque is increased with the reduction in the drive torque of the engine so that the torque fluctuations may not be sufficiently absorbed exclusively by the reduction in the engaging force of the clutch 20. If, in this case, the operation of the clutch 20 is stopped, i.e., the clutch 20 is completely disengaged, a sufficient absorbing action is obtained to further improve the effect of preventing the vibrations of the vehicular body.

Figure 10:
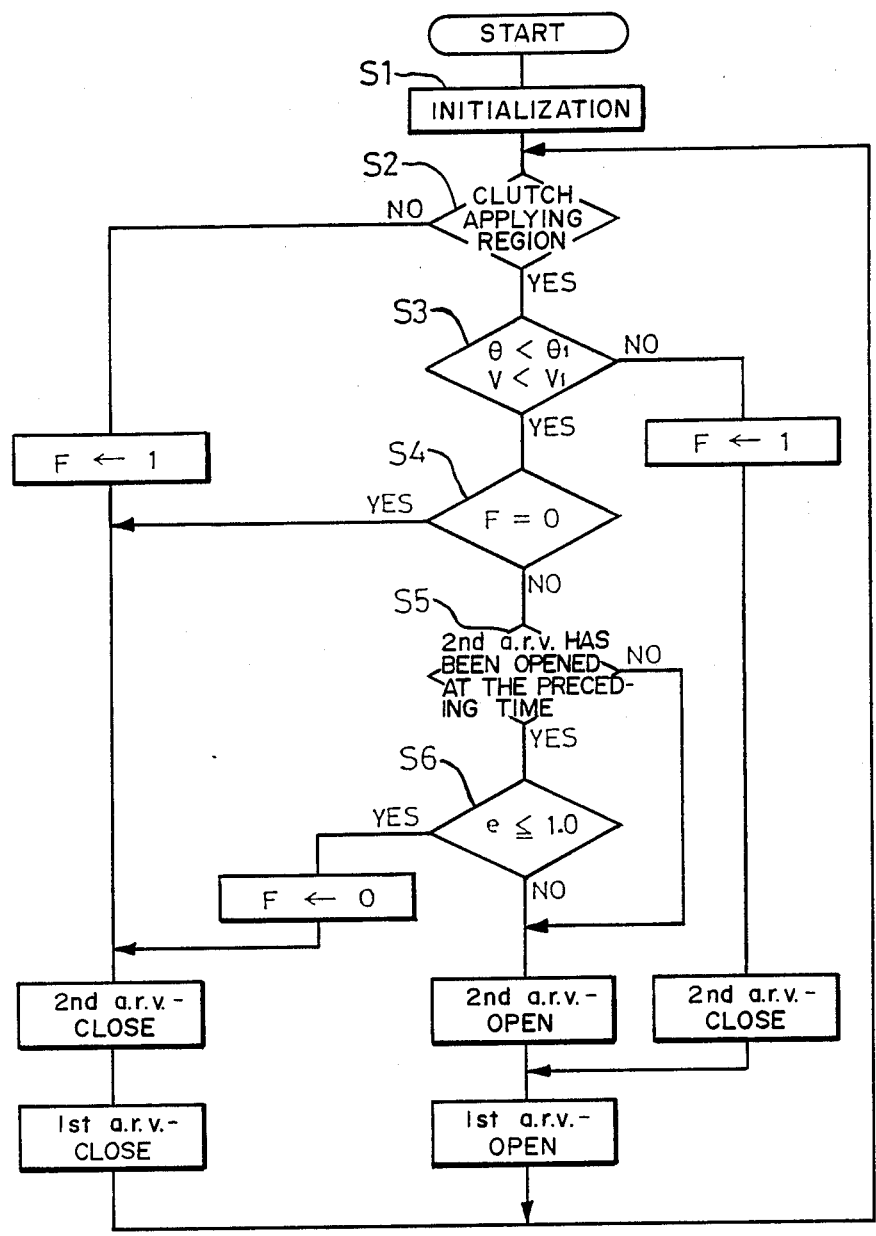
Figure 11:
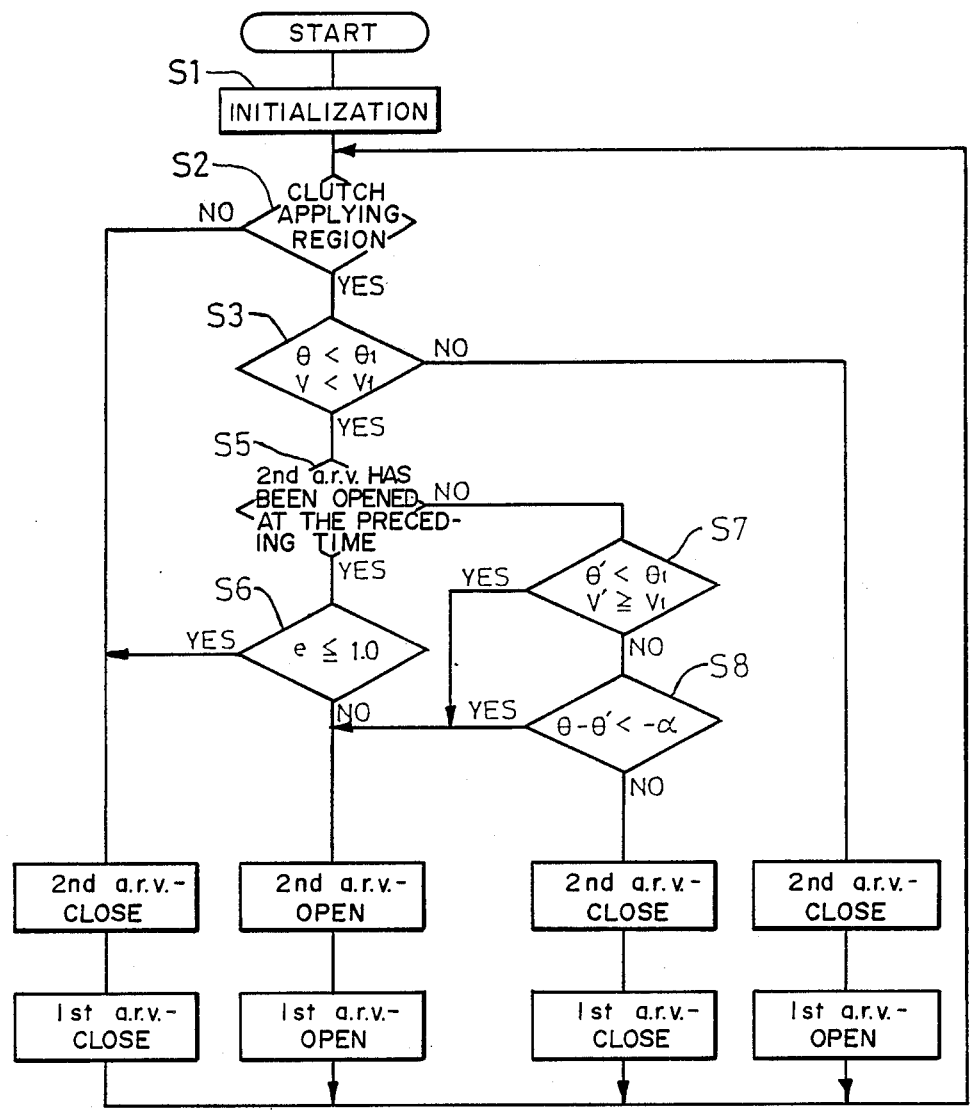

For stopping the operation of the clutch 20, there are the systems shown in FIG. 10 and FIG. 11, which correspond to the foregoing embodiments of FIG. 8 and FIG. 9, respectively. The difference in the systems of FIGS. 10 and 11 from the embodiments of FIGS. 8 and 9 resides in that both the 1st and 2nd atmospheric release valves 125a and 125b are closed when the judgment "YES" is made at the step S6 in the embodiments of FIGS. 10 and 11.

As has been described hereinbefore, according to the embodiments of FIGS. 6 through 11 of the present invention, during deceleration in the vehicular speed range in which the clutch is operated in its slipping state, the engaging force of the clutch is increased so that a sufficient braking effect by the engine can be attained. During the cruising run with the accelerator pedal being slightly depressed, the torque fluctuations of the engine are absorbed by stopping the increase in the engaging force of the clutch or the operation itself of the clutch so that vibrations of the vehicle can be prevented to enhance the comfort operation of the vehicle.

Figure 12:
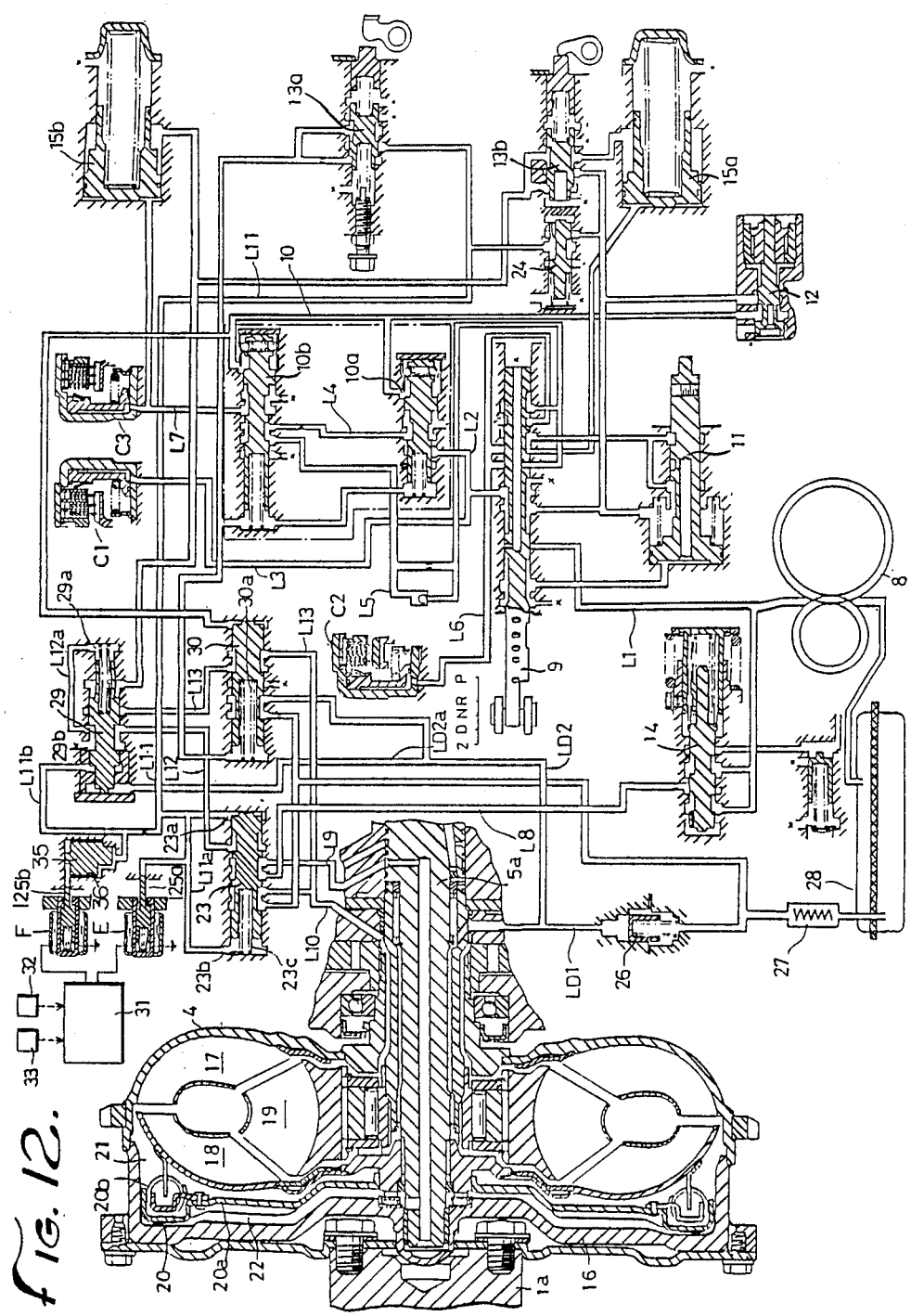
FIG. 12 is a diagramatic illustration of a third embodiment of the hydraulic circuit of the transmission equipped with the apparatus for executing the present invention.

Referring now to FIGS. 12 through 15 which relate to a third embodiment of this invention, again all of the same numerals and letters are used that refer to components and the like that are the same as those in the first and second embodiments and will not be described here in detail again. The control system of FIG. 12 is substantially similar to the systems of the first and second embodiments of FIGS. 2 and 6, and is usuable in the typical vehicular power train shown in FIG. 1. As with the second embodiment of FIG. 6, the 1st and 2nd atmospheric release valves 125a and 125b are controlled by an electronic circuit 31 equipped with a microcomputer. Here the electronic circuit 31 is responsive only to a signal from a throttle open degree detecting means 32 and a signal from a vehicular speed detecting means 33 for opening the 1st atmospheric release valve 125a in the clutch applying region (vehicle speeds above curve A in FIG. 13) and for opening the 2nd atmospheric release valve 125b (only under special conditions as described below). The engine r.p.m. is not used in this embodiment as it was in the second embodiment. In all other respects this embodiment operates the same as the first and second embodiments, except as described below, and follows the same formulas for operation.

Figure 13:
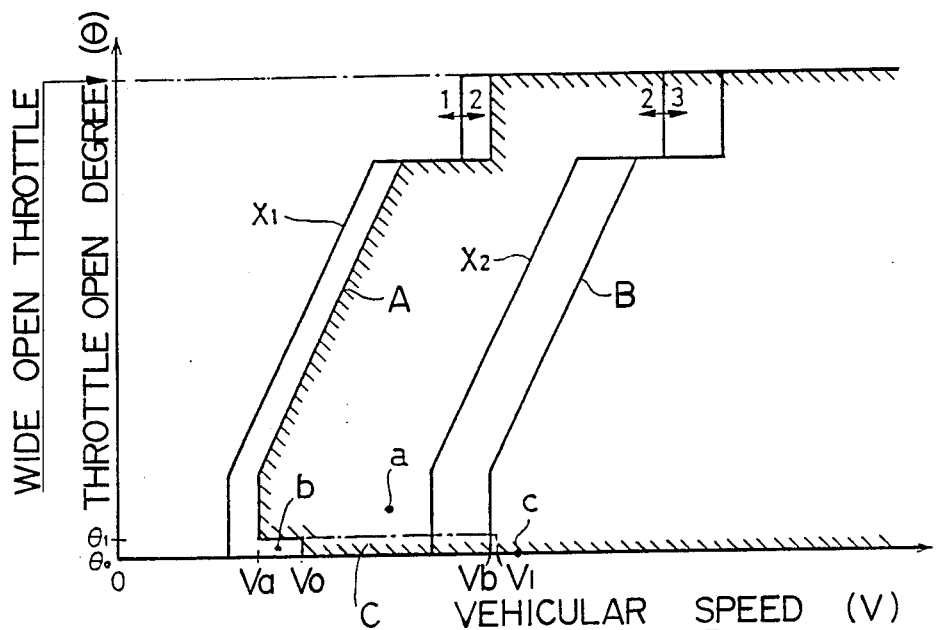
FIG. 13 is a graph showing the operating characteristics of the clutch of the third embodiment of FIG. 12.

Referring now to the graph of FIG. 13, the region C is defined in the range of $\theta < \theta_1$ and $V_0 < V < V_1$ for a throttle open degree $\theta$ and a vehicular speed V, similar to that shown in FIG. 7. However, in this third embodiment, the speed value $V_1$ is slightly larger rather than smaller than the lower limit $V_b$ of the directly connected range of the clutch 20 defined by the curve B. This is established in this manner so as to prevent the possibility that the control valve 30 may be opened on the higher speed side of $V_1$ due to the tolerances of the hydraulic control parts, i.e., that the increase in the clutch engaging force during the deceleration may not be achieved in the vehicular speed range between $V_1$ and $V_b$ because of $V_1 < V_b$.

Moreover, the curve A is offset toward the higher speed side with a range of $\theta < \theta_1$ so that the speed value $V_0$ is larger than the vehicular speed $V_a$ for $\theta = \theta_1$. This is to prevent the engine from being stopped by the operation of the clutch 20 during abrupt deceleration to $V_0$ or a lower speed.

Figure 14:
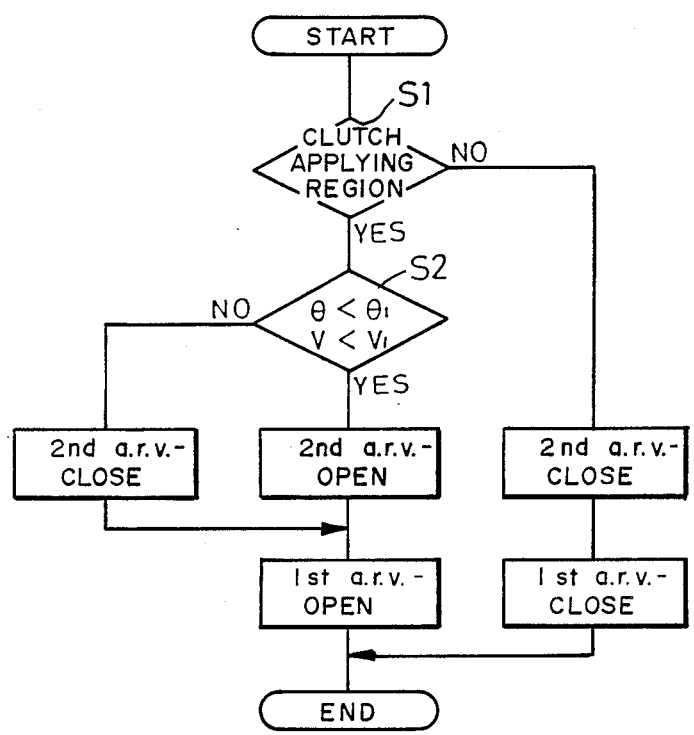
FIGS. 14 and 15 are flow charts showing the respective programs of the electronic control circuit for the third embodiment shown in FIG. 12.

FIG. 14 is a flow chart showing the program of the aforementioned electronic control circuit 31 for this third embodiment. At a step S1, it is judged whether or not the running state falls within the clutch applying region, i.e., within a higher speed region than the curve A. At a step S2, it is judged whether or not the latest throttle open degree $\theta$ and vehicular speed V fall within $\theta < \theta_1$ and $V < V_1$, i.e., within the C region.

Here, if the running state fails to belong to the clutch applying region, the judgment is "NO" at the step S1 so that both the 1st and 2nd atmospheric release valves 125a and 125b are closed. However, if the running state belongs to the clutch applying region, the judgment is "YES" at the step S1 so that the operation proceeds to the step S2. Outside of the C region, the judgment is "NO" at the step S2. In this case, the 2nd atmospheric release valve 125b is held in its closed state whereas the 1st atmospheric release valve 125a is opened so that the control valve 23 is switched to the clutch applied position, as has been described hereinbefore. As a result, the clutch 20 is operated in its slipping state in the vehicular speed range between the curves A and B by the control of the control valve 30 but is operated in its directly connected state in a higher speed range than the curve B.

On the other hand, if the accelerator pedal is released to change the throttle open degree $\theta$ to the value $\theta_0$ so as to effect a deceleration from the running state belonging to the slipping region of the clutch 20, as indicated at a point "a" in FIG. 13, the running state is shifted to the C region so that the judgment "YES" is made at the step S2. As a result, the 2nd atmospheric release valve 125b is opened so that the clutch engaging force is increased, as described above, to provide a sufficient braking effect by the engine.

If the deceleration is made from the C region to the lowerspeed range indicated by a point "b" in FIG. 13, the judgment "NO" is made at the step S1 so that the 1st and 2nd atmospheric release valves 125a and 125b are closed, as described above, to switch the control valve 23 to the clutch releasing position to release the operation of the clutch 20.

Here, if the engaging force of the clutch 20 is increased in the C region at a low temperature, the pressure rise of the back pressure chamber 22 is delayed because of the high oil viscosity, even if the control valve 23 is switched upon the deceleration from the C region to the clutch releasing position. It takes a significant period of time for the clutch 20 to be released whereby an engine stall is liable to occur upon the abrupt deceleration at the low temperature.

In the shown third embodiment of FIG. 12, therefore, there is formed in the connection passage of the 2nd atmospheric release valve 125b to the aforementioned branch oil line L11b an oil chamber 36 into which a plug 35 is inserted to form therearound an annular clearance for providing a restricted oil passage. According to this construction, the flow rate of the oil to pass through that clearance is highly subject to the influences of the viscosity so that the flow rate is remarkably reduced at low temperature and high viscosity even if the 2nd atmospheric release valve 125b is opened. As a result, the internal pressure of the branch oil line L11b is maintained at a level near Pm to establish a state similar to that as if the 2nd atmospheric release valve 125b is closed. As a result, the increase in the engaging force of the clutch 20 is stopped in the C region at low temperature so that it is held at the low level. Thus, the clutch 20 is released by a relatively small rise of the internal pressure of the back pressure chamber 22. Even if the pressure rising rate of the back pressure chamber 22 is delayed by the influences of the viscosity, the clutch 20 is quickly released by the deceleration from the C region so that no engine stall is caused even by the abrupt deceleration at low temperature.

Figure 15:
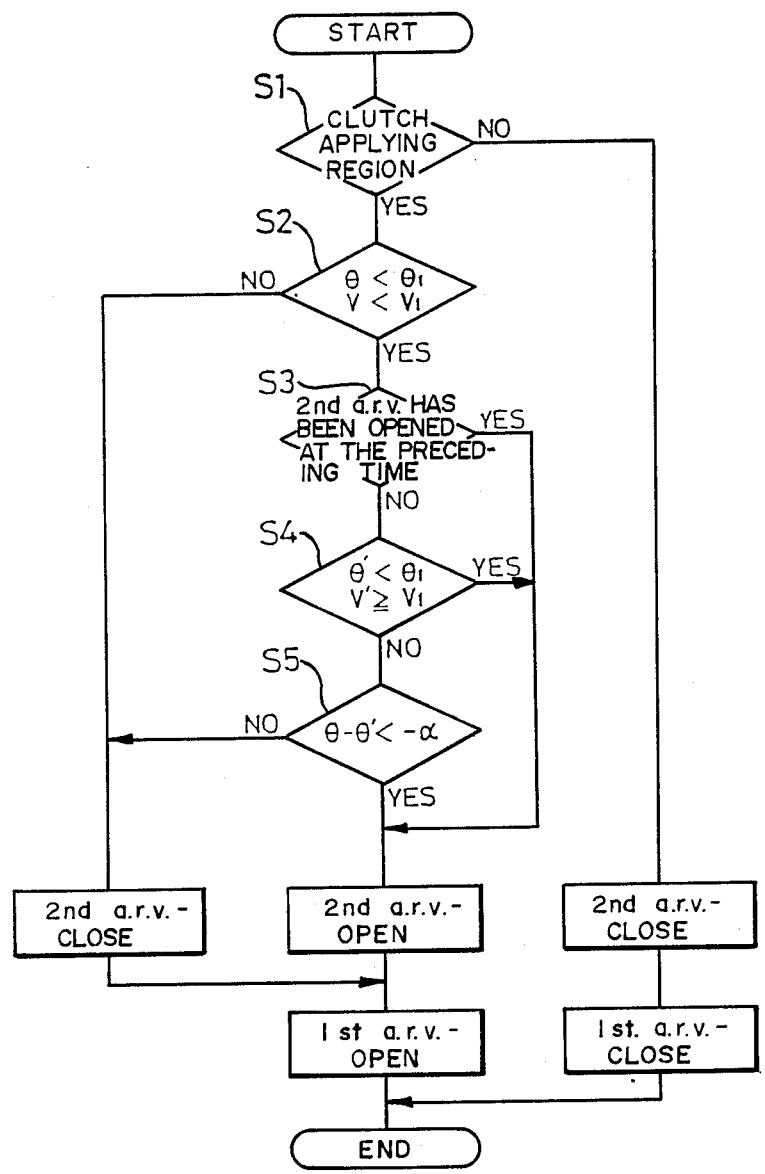

In the aforementioned program shown in FIG. 14, the shift to deceleration is judged in terms of whether or not the throttle open degree falls below $\theta 1$. Despite this fact, however, the judgment may be considering the reducing rate of the throttle open degree, as shown in FIG. 15. In this program, there are added to the foregoing steps S1 and S2 the following: a step S3 of judging whether or not the 2nd atmospheric release valve 125b has been opened at the preceding time; a step S4 of judging whether or not the throttle open degree $\theta'$ and vehicular speed V' just before the latest throttle open degree $\theta$ and vehicular speed V fall within the ranges: $\theta < \theta 1$ and $V' \geq V1$; and a step S5 of judging whether or not the difference between the latest throttle open degree $\theta$ and the previous throttle open degree $\theta$ is smaller than a negative predetermined value $-\alpha$, i.e., whether or not the reducing rate of the throttle open degree is higher than a predetermined rate.

According to this method of FIG. 15, when the accelerator pedal is promptly returned to the C region so as to cause a deceleration from the point "a" of FIG. 13, the operation proceeds from the step S1 to the step S5 in the order S2→S3→S4. At the step S5, the judgment "YES" is made to open the 2nd atmospheric release valve 125b. Thereafter, so long as the running state is in the C region, the judgment at the step S3 is "YES" so that valve 125b is held in its open state. In case, however, the vehicle runs from a flat road to a gentle downhill so that it is shifted to the C region by gradually releasing the accelerator pedal to effect the cruising while holding the throttle open degree between $\theta 0$ and $\theta 1$, the judgment made at the step S5 is "NO" so that the 2nd atmospheric release valve 125b is not opened to prevent the vibrations of the vehicular body due to the increase in the clutch engaging force.

On the other hand, if the vehicle is brought into deceleration from a higher speed than V1 by releasing the accelerator pedal so that the vehicle is shifted with a drop of the vehicular speed into the C region from a point "c" of FIG. 13, in which the clutch 20 is operated in its directly connected state, the judgment "YES" is made at the step S4 to open the 2nd atmospheric release valve 125b so that the sufficient braking effect by the engine can be continuously attained even at a vehicular speed lower than V1.

In the present embodiment of FIGS. 12–15, the increase in the engaging force of the clutch 20 in the C region is stopped at low temperatures by the regulation of the passage of the oil through an oil chamber 36 but other means may be used for performing that function. For example, a signal from a temperature sensor for detecting the temperature of the engine cooling water or the transmission oil may be communicated to the electronic control circuit 31 so that the 2nd atmospheric release valve 125b may be held in its closed state at the low temperature even in the C region.

As has been described hereinbefore, according to this third embodiment of the present invention, at a low temperature the increase in the clutch engaging force is stopped and the operation of the clutch is promptly released upon the deceleration to the lowerspeed range so that no engine stall is caused even by the abrupt deceleration at the low temperature.

Although we have fully described the invention in connection with three specific embodiments and alternate operating programs, it is to be understood and will readily appear to those skilled in the art that various modifications and additions can be made to these embodiments without departing from the scope of the present invention as set forth in the accompanying claims.

We claim:

1. A method for controlling a clutch in a fluid torque converter of a vehicular transmission connected to an engine having a throttle valve wherein the clutch is provided for mechanically connecting the input and output sides of the fluid torque converter under certain conditions and is operated within a predetermined vehicular speed range by such a relatively low engaging force determined according to at least throttle open degree as to allow slippage of the clutch, comprising the steps of determining when the throttle valve attains a throttle open degree below a predetermined reference value and the vehicular speed falls within said predetermined range, and immediately responsive thereto, exclusively increasing the engaging force of the clutch above that which is normally established at said predetermined reference throttle value.

2. The method of claim 1 wherein the clutch engaging force is increased above that which is normally established within said predetermined vehicular speed range.

3. The method of controlling the clutch of claim 1, comprising the steps of determining when the r.p.m. of the output side of the fluid torque converter falls below the r.p.m. at the input side and the throttle valve has a throttle open degree below said predetermined reference value, and stopping the increase in the engaging force of the clutch.

4. The method of claim 3 wherein the stopping of the increase in the engaging force comprises completely stopping the engaging operation of the clutch.

5. Th method of claim 1 including stopping the increase in the engaging force of the clutch below said predetermined reference throttle open degree when oil in the transmission is at a low temperature.

6. The method of claim 5 wherein said step of stopping of the increase in the engaging force includes determining a low the temperature of the oil.

7. A method for controlling a clutch in a fluid torque converter of a vehicular transmission connected to an engine having a throttle valve wherein the clutch is provided for mechanically connecting the input and output sides of the fluid torque converter under certain conditions and is operated within a predetermined vehicular speed range by such a relatively low engaging force as to allow slippage of said clutch but wherein the clutch engaging force is increased when the throttle open degree of the engine throttle valve falls below a predetermined reference value, comprising the steps of determining when the r.p.m. of the output side of the fluid torque converter falls below the r.p.m. at the input side and throttle valve has a low throttle open degree below the predetermined reference value, and stopping the increase in the engaging force of said clutch.

8. A method for controlling a clutch in a fluid torque converter of a vehicular transmission connected to an engine having a throttle valve wherein the torque converter has an input side and an output side and the clutch is provided for mechanically connecting the input and output sides of the fluid torque converter under certain conditions and the clutch is operated within a predetermined vehicular speed range by such a relatively low engaging force determined at least according to throttle open degree as to allow slippage of the clutch and further, in which, a region of low throttle open degree where the throttle valve opening degree of said engine falls below a predetermined reference value, the engaging force of said clutch is increased more than that established at said reference throttle value, comprising the steps of determining when the r.p.m. of the output side of said fluid torque converter falls below the r.p.m. at the input side even in said low throttle open degree region, and stopping the operation of said clutch in response to such determination.

9. A method for controlling a hydraulic oil operated clutch in a fluid torque converter of a vehicular transmission connected to an engine having a throttle valve wherein the hydraulic oil operated clutch is provided for mechanically connecting the input and output sides of the fluid torque converter under certain conditions and the clutch is operated within a predetermined vehicular speed range by such a relatively low engaging force determined at least according to throttle open degree as to allow slippage of the clutch and further, in which, in a region of low throttle open degree where the throttle open degree of said engine falls below a predetermined reference value, the engaging force of said clutch is increased more than that established at said reference throttle value, comprising the steps of determining a low temperature of the hydraulic oil and stopping the increase in the engaging force of the clutch at the low temperature of the hydraulic oil even in said low throttle open degree region.

10. In a control for a clutch in a fluid torque converter of a vehicular transmission connected to an engine having a throttle valve wherein the clutch is provided for mechanically connecting the input and output sides of the fluid torque converter under certain conditions and normally is operated within a predetermined vehicular speed range by such a relatively low engaging force determined according to at least throttle open degree as to allow slippage of said clutch, and improvement comprising, means for determining when the throttle valve attains a throttle open degree below a predetermined reference value and the vehicular speed falls within said predetermined range, and means for exclusively increasing the engaging force of said clutch above that which is normally established at said predetermined reference throttle value when the throttle valve attains a throttle open degree below the predetermined reference value.

11. The improved control of claim 10 wherein, means are provided for determining and comparing the r.p.m. of the input side and the r.p.m. of the output side of the fluid torque converter, and means for stopping the increase in the engaging force of the clutch when the r.p.m. of the output side falls below the r.p.m. of the input side while the throttle degree open is below the predetermined reference value.

12. The improved control of claim 11 wherein, the means for stoppihg the increase in the engaging force causes the operation of the clutch to stop.

13. The improved control of claim 10 wherein, means are provided for stopping the increase in the engaging force of the clutch when the temperature of oil in the transmission is below a low value.

* * * * *